United States Patent
Clark et al.

(10) Patent No.: US 9,367,453 B1
(45) Date of Patent: *Jun. 14, 2016

(54) SYSTEM AND METHOD FOR MIGRATING CACHE DATA

(75) Inventors: Roy E. Clark, Hopkinton, MA (US); Randall H. Shain, Wrentham, MA (US); Robert W. Beauchamp, Littleton, MA (US); Michel F. Fisher, Natick, MA (US)

(73) Assignee: EMC Corporation, Hopkinton, MA (US)

( * ) Notice: Subject to any disclaimer, the term of this patent is extended or adjusted under 35 U.S.C. 154(b) by 233 days.

This patent is subject to a terminal disclaimer.

(21) Appl. No.: 13/249,585

(22) Filed: Sep. 30, 2011

(51) Int. Cl.
*G06F 12/08* (2006.01)
*G06F 9/455* (2006.01)

(52) U.S. Cl.
CPC .............. *G06F 12/08* (2013.01); *G06F 9/455* (2013.01)

(58) Field of Classification Search
CPC .................... G06F 9/45558; G06F 2009/4557; G06F 9/4856
USPC .......................................... 711/119, 113, 162
See application file for complete search history.

(56) References Cited

U.S. PATENT DOCUMENTS

| | | | |
|---|---|---|---|
| 8,365,169 B1 * | 1/2013 | Watson et al. ................. 718/1 |
| 8,370,577 B2 * | 2/2013 | Sheaffer et al. .............. 711/118 |
| 8,635,318 B1 * | 1/2014 | Shankar et al. .............. 709/223 |
| 2005/0091354 A1 * | 4/2005 | Lowell et al. ................ 709/223 |
| 2005/0091448 A1 * | 4/2005 | Nakatani et al. ............. 711/113 |
| 2005/0177672 A1 * | 8/2005 | Rao ................................. 711/3 |
| 2006/0005189 A1 * | 1/2006 | Vega et al. ...................... 718/1 |
| 2006/0277350 A1 * | 12/2006 | Lubbers ........................... 711/3 |
| 2007/0180436 A1 * | 8/2007 | Travostino et al. ........... 717/138 |
| 2007/0288921 A1 * | 12/2007 | King et al. ....................... 718/1 |
| 2008/0010409 A1 * | 1/2008 | Rao et al. ...................... 711/118 |
| 2008/0222375 A1 * | 9/2008 | Kotsovinos et al. .......... 711/162 |
| 2009/0193207 A1 * | 7/2009 | Ogata et al. .................. 711/162 |
| 2010/0169537 A1 * | 7/2010 | Nelson ............................ 711/6 |
| 2010/0322255 A1 * | 12/2010 | Hao et al. ..................... 370/398 |
| 2011/0258391 A1 * | 10/2011 | Atkisson et al. ............. 711/118 |
| 2011/0320556 A1 * | 12/2011 | Reuther ........................ 709/213 |
| 2012/0030306 A1 * | 2/2012 | Kami .................... G06F 3/0617 709/213 |
| 2012/0066677 A1 * | 3/2012 | Tang ............................... 718/1 |
| 2012/0239853 A1 * | 9/2012 | Moshayedi .................... 711/118 |
| 2012/0304171 A1 * | 11/2012 | Joshi ................... G06F 9/45558 718/1 |
| 2013/0031341 A1 * | 1/2013 | Ganti et al. ..................... 713/2 |
| 2013/0081013 A1 * | 3/2013 | Plondke et al. ................ 718/1 |

\* cited by examiner

*Primary Examiner* — Adam M Queler
*Assistant Examiner* — Kenneth Tsang
(74) *Attorney, Agent, or Firm* — Brian J. Colandreo; Mark H. Whittenberger; Holland & Knight LLP (57) ABSTRACT

A computer-implemented method, computer program product and computing system for moving at least a portion of cache data from a first cache storage device coupled to a first computing device included within a first virtual machine to a shared storage device. The at least a portion of cache data is moved from the shared storage device to a second cache storage device coupled to a second computing device included within a second virtual machine.

15 Claims, 3 Drawing Sheets

SYSTEM AND METHOD FOR MIGRATING CACHE DATA

TECHNICAL FIELD

This disclosure relates to cache memory systems and, more particularly, to enhanced functionality cache memory systems.

BACKGROUND

Storing and safeguarding electronic data is of paramount importance in modern business. Accordingly, various systems may be employed to protect such electronic data.

The use of solid-state storage devices is increasing in popularity. A solid state storage device is a data storage device that uses solid-state memory to store persistent data. A solid-state storage device may emulate (and therefore replace) a conventional hard disk drive. Additionally/alternatively, a solid state storage device may be used within a cache memory system. With no moving parts, a solid-state storage device largely eliminates (or greatly reduces) seek time, latency and other electromechanical delays and failures associated with a conventional hard disk drive.

SUMMARY OF DISCLOSURE

In a first implementation, a computer-implemented method includes moving at least a portion of cache data from a first cache storage device coupled to a first computing device included within a first virtual machine to a shared storage device. The at least a portion of cache data is moved from the shared storage device to a second cache storage device coupled to a second computing device included within a second virtual machine.

One or more of the following features may be included. The cache data may include cache user data. Cache metadata may be moved from the first cache storage device coupled to the first computing device included within the first virtual machine to the second cache storage device coupled to the second computing device included within the second virtual machine.

The cache data may include cache metadata. The shared storage device may include flash memory. The shared storage device may be included within a storage area network. The first and/or second cache storage devices may include flash memory.

In another implementation, a computer program product resides on a computer readable medium that has a plurality of instructions stored on it. When executed by a processor, the instructions cause the processor to perform operations including moving at least a portion of cache data from a first cache storage device coupled to a first computing device included within a first virtual machine to a shared storage device. The at least a portion of cache data is moved from the shared storage device to a second cache storage device coupled to a second computing device included within a second virtual machine.

One or more of the following features may be included. The cache data may include cache user data. Cache metadata may be moved from the first cache storage device coupled to the first computing device included within the first virtual machine to the second cache storage device coupled to the second computing device included within the second virtual machine.

The cache data may include cache metadata. The shared storage device may include flash memory. The shared storage device may be included within a storage area network. The first and/or second cache storage devices may include flash memory.

In another implementation, a computing system includes a processor and memory configured to perform operations including moving at least a portion of cache data from a first cache storage device coupled to a first computing device included within a first virtual machine to a shared storage device. The at least a portion of cache data is moved from the shared storage device to a second cache storage device coupled to a second computing device included within a second virtual machine.

One or more of the following features may be included. The cache data may include cache user data. Cache metadata may be moved from the first cache storage device coupled to the first computing device included within the first virtual machine to the second cache storage device coupled to the second computing device included within the second virtual machine.

The cache data may include cache metadata. The shared storage device may include flash memory. The shared storage device may be included within a storage area network. The first and/or second cache storage devices may include flash memory.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

System Overview:

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 1:
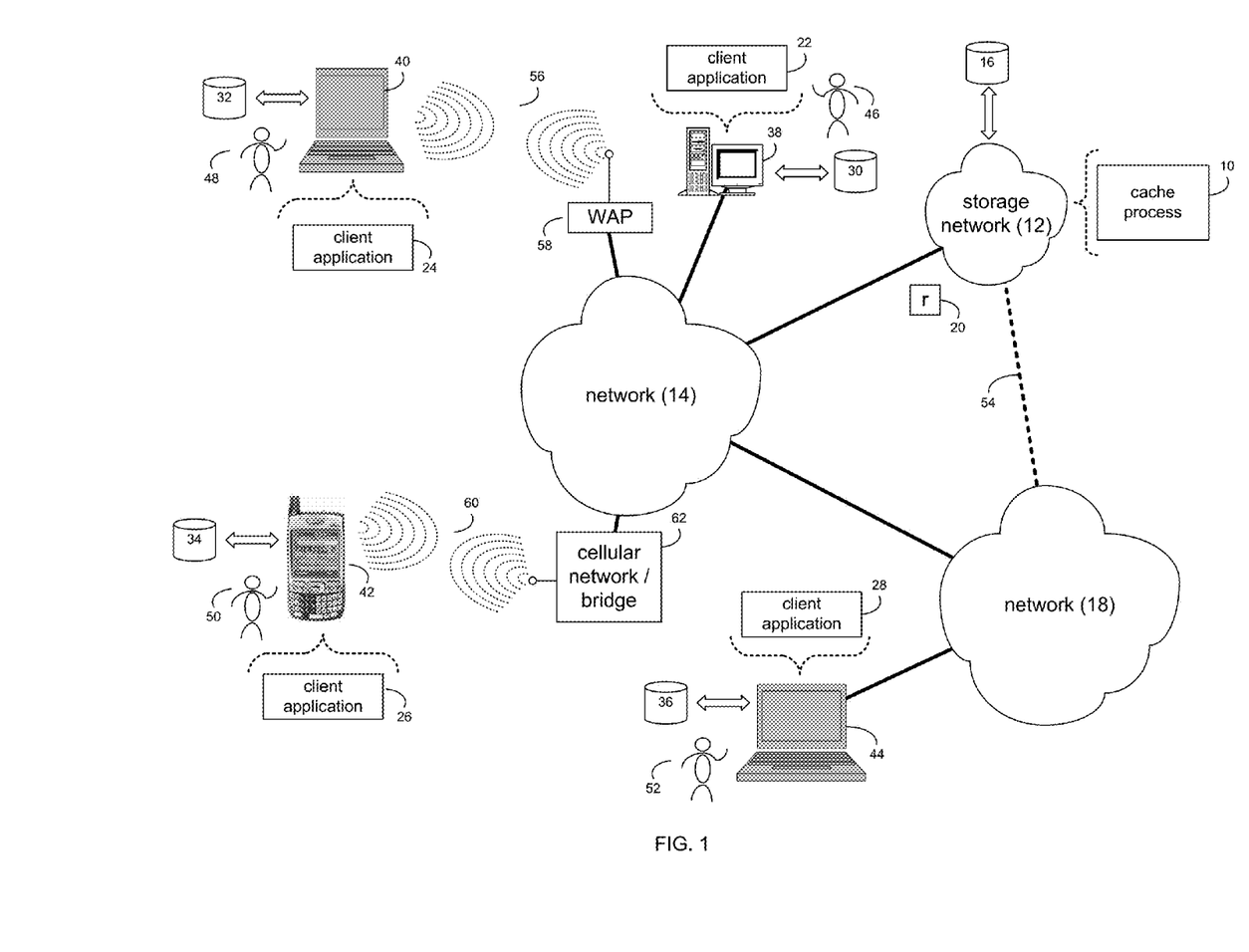
FIG. 1 is a diagrammatic view of a storage network and a cache process coupled to a distributed computing network.

Referring to FIG. 1, there is shown cache process 10 that may reside on and may be executed by storage network 12, which may be connected to network 14 (e.g., the Internet or a local area network). Storage network 12 may include or may be a portion of one or more storage area networks (SAN). As will be discussed below in greater detail, a SAN may include one or more of a personal computer, a server computer, a series of server computers, a mini computer, a mainframe computer, a RAID array and an NAS. The various components of storage network 12 may execute one or more operating systems, examples of which may include but are not limited to: Microsoft Windows XP Server™; Novell Netware™; Redhat Linux™, Unix, or a custom operating system, for example.

As will be discussed below in greater detail, cache process 10 may move at least a portion of cache data from a first cache storage device coupled to a first computing device included within a first virtual machine to a shared storage device. The cache data may be moved from the shared storage device to a second cache storage device coupled to a second computing device included within a second virtual machine.

The instruction sets and subroutines of cache process 10, which may be stored on storage device 16 included within storage network 12, may be executed by one or more processors (not shown) and one or more memory architectures (not shown) included within storage network 12. Storage device 16 may include but is not limited to: a hard disk drive; a flash drive, a tape drive; an optical drive; a RAID array; a random access memory (RAM); and a read-only memory (ROM).

Network 14 may be connected to one or more secondary networks (e.g., network 18), examples of which may include but are not limited to: a local area network; a wide area network; or an intranet, for example.

Various data requests (e.g. data request 20) may be sent from client applications 22, 24, 26, 28 to storage network 12. Examples of data request 20 may include but are not limited to data write requests (i.e. a request that a data segment be written to storage network 12) and data read requests (i.e. a request that a data segment be read from storage network 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; flash drives, tape drives; optical drives; RAID arrays; random access memories (RAM); and read-only memories (ROM). Examples of client electronic devices 38, 40, 42, 44 may include, but are not limited to, personal computer 38, laptop computer 40, personal digital assistant 42, notebook computer 44, a server (not shown), a data-enabled, cellular telephone (not shown), and a dedicated network device (not shown).

Users 46, 48, 50, 52 may access storage network 12 directly through network 14 or through secondary network 18. Further, storage network 12 may be connected to network 14 through secondary network 18, as illustrated with phantom link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, Wi-Fi, and/or Bluetooth device that is capable of establishing wireless communication channel 56 between laptop computer 40 and WAP 58. Personal digital assistant 42 is shown wirelessly coupled to network 14 via wireless communication channel 60 established between personal digital assistant 42 and cellular network/bridge 62, which is shown directly coupled to network 14.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

Client electronic devices 38, 40, 42, 44 may each execute an operating system, examples of which may include but are not limited to Microsoft Windows™, Microsoft Windows CE™, Redhat Linux™, or a custom operating system.

Figure 2:
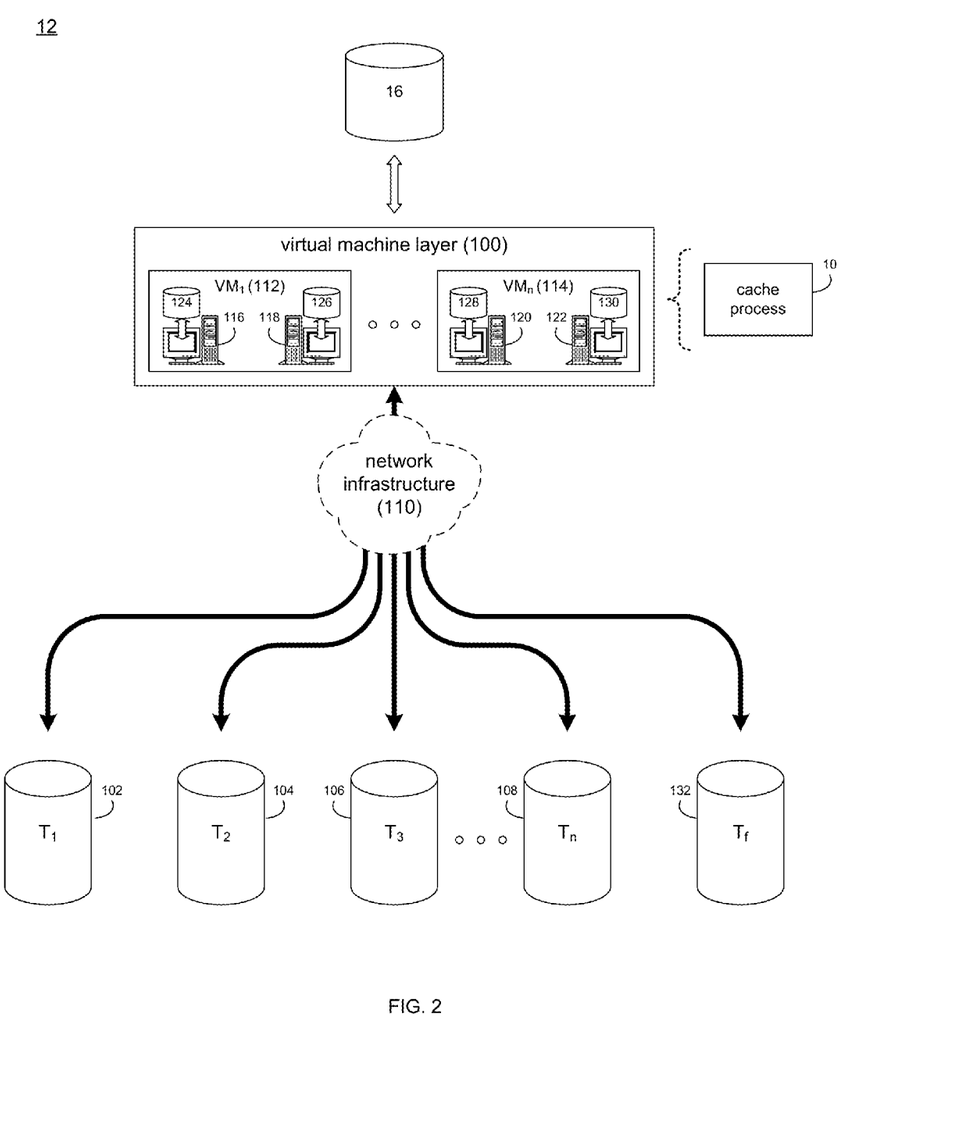
FIG. 2 is a diagrammatic view of the storage network of FIG. 1.

The Cache Process:

Referring also to FIG. 2, storage network 12 may include a virtual machine layer (e.g. virtual machine layer 100) and a plurality of storage targets $T_{1-n}$ (e.g. storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Additionally/alternatively, one or more of storage targets 102, 104, 106, 108 may be configured as a RAID 1 array, in which data is mirrored between storage targets. By mirroring data between storage targets, a level of high availability is achieved as multiple copies of the data are stored within storage network 12.

While in this particular example, storage network 12 is shown to include four storage targets (e.g. storage targets 102, 104, 106, 108), this is for illustrative purposes only and is not intended to be a limitation of this disclosure. Specifically, the actual number of storage targets may be increased or decreased depending upon e.g. the level of redundancy/performance/capacity required.

As discussed above, storage network 12 may include or be a portion of one or more SANs, wherein virtual machine layer 100 includes a plurality of application servers that run network-based applications that are accessed via client applications 22, 24, 26, 28. Examples of such network-based applications may include but are not limited to database applications, document management applications, engineering design applications, and email applications.

When storage network 12 is configured as a SAN, the various components of storage network 12 (e.g. virtual machine layer 100 and storage targets 102, 104, 106, 108) may be coupled using network infrastructure 110, examples of which may include but are not limited to a Layer 2 network and a Layer 3 network.

As is known in the art, the data link layer is Layer 2 of the seven-layer OSI model as well as the five-layer TCP/IP model. Layer 2 may respond to service requests from the network layer and may issue service requests to the physical layer. Within a Layer 2 network, devices (e.g. the devices within virtual machine layer 100 and storage targets 102, 104, 106, 108) may be addressed using MAC (i.e., Media Access Control) addresses. When network infrastructure 110 is a Layer 2 network infrastructure, the devices within virtual machine layer 100 and storage targets 102, 104, 106, 108 may have a unique MAC address.

Further and as is known in the art, the network layer is Layer 3 of the seven-layer OSI model as well as the five-layer TCP/IP model. Layer 3 may respond to service requests from the transport layer and may issue service requests to the data link layer. In the TCP/IP model, Layer 3 may be referred to as the Internet layer. Within a Layer 3 network, devices (e.g. the devices within virtual machine layer 100 and storage targets 102, 104, 106, 108) may be addressed using IP (i.e., Internet Protocol) addresses. When network infrastructure 110 is a Layer 3 network infrastructure, each of the devices within virtual machine layer 100 and storage targets 102, 104, 106, 108 may have a unique IP address.

Generally, the network layer (i.e., Layer 3) may be responsible for end-to-end (e.g., source to destination) data delivery, whereas the data link layer (i.e., Layer 2) may be responsible for node-to-node (e.g., hop to hop) data delivery.

Virtual machine layer 100 may execute all or a portion of cache process 10. Additionally, one or more of storage targets 102, 104, 106, 108 may execute all or a portion of cache process 10. For example, cache process 10 may be a multi-component process that includes e.g., a VM Layer-based component (not shown) and a target-based component (not shown). For example and for illustrative purposes, the VM Layer-based component of cache process 10 may be executed on virtual machine layer 100. Further and for illustrative purposes, the target-based component of cache process 10 may be executed on each of storage targets 102, 104, 106, 108. Accordingly, the VM Layer-based component of cache process 10 and the target-based component(s) of cache process 10 may cooperatively operate to effectuate all of the functionality of cache process 10.

The instruction sets and subroutines of the VM Layer-based component of cache process 10, which may be stored on a storage device (e.g., storage device 16) coupled to virtual machine layer 100, may be executed by one or more processors (not shown) and one or more memory architectures (not shown) included within virtual machine layer 100. Storage device 16 may include but is not limited to: a hard disk drive; a tape drive; an optical drive; a RAID array; a random access memory (RAM); and a read-only memory (ROM).

The instruction sets and subroutines of the target-based component of cache process 10, which may be stored on a storage device (not shown) coupled to e.g., each of storage targets 102, 104, 106, 108 may be executed by one or more processors (not shown) and one or more memory architectures (not shown) included within each of storage targets 102, 104, 106, 108. The storage device (not shown) may include but is not limited to: a hard disk drive; a flash drive; a tape drive; an optical drive; a RAID array; a random access memory (RAM); and a read-only memory (ROM).

Virtual machine layer 100 may include one or more virtual machines $V_{1-n}$ (e.g., virtual machines 112, 114) and each of these virtual machines may include one or more physical computing devices (e.g., server computers 116, 118 for virtual machine 112 and server computers 120, 122 for virtual machine 114). Each of these physical computing devices may have a storage device physically coupled to it. For example, server computer 116 is shown to be coupled to storage device 124; server computer 118 is shown to be coupled to storage device 126; server computer 120 is shown to be coupled to storage device 128; and server computer 122 is shown to be coupled to storage device 130. Examples of storage devices 124, 126, 128, 130 may include but are not limited to: hard disk drives; flash drives; tape drives; optical drives; RAID arrays; random access memories (RAM); and read-only memories (ROM).

As is known in the art, a virtual machine is a software implementation of a computing device that is configured to execute programs like a physical machine. Virtual machines may be separated into two categories (based upon their use and degree of correspondence to any real machine), namely: a system virtual machine that is configured to provide a complete system platform that supports the execution of a complete operating system; and a process virtual machine that is configured to execute a single program.

For illustrative purposes only and for one particular embodiment, assume that storage devices 124, 126, 128, 130 are flash-based storage devices that are configured to function as cache devices for data that is being stored to and/or retrieved from one or more of storage targets 102, 104, 106, 108.

As storage network 12 is typically configured for high-availability, multiple virtual machines may be employed (e.g., virtual machines 112, 114). Accordingly, during the normal course of operation of virtual machine layer 100, certain virtual machines may need to be brought out of service and other virtual machines may need to be brought into service to replace those virtual machines that were brought out of service.

For illustrative purposes, assume that virtual machine 112 needs to be brought down and, therefore, virtual machine 114 needs to be brought into service to perform the functionality that was previously being performed by virtual machine 112. As storage network 12 is configured for high availability, functional continuity is important. Accordingly, virtual machine 112 will typically not be shut down until virtual machine 114 is up and performing the functionality that was previously being handled by virtual machine 112. Accordingly, to a user (e.g., users 46, 48, 50, 52) that is using one of the applications that is being executed on virtual machine 112, the transition from virtual machine 112 to virtual machine 114 should be seamless and should go unnoticed by the user.

Continuing with the above-stated example in which virtual machine 112 needs to be brought down and replaced by virtual machine 114, assume for illustrative purposes that only server computer 116 within virtual machine 112 is operating (e.g., server computer 118 is configured for spare capacity). As discussed above and for this particular example, storage device 124 (which is coupled to server computer 116) is configured as a cache storage device for server computer 116. Accordingly, since storage device 124 is functioning as a cache storage device for server computer 116 included within virtual machine 116, in order to have a successful transition from virtual machine 112 to virtual machine 114, the content of storage device 124 should be transferred from storage device 124 to a storage device coupled to a server computer included within the target virtual machine. In this particular example, the target virtual machine is virtual machine 114. For illustrative purposes, assume that server computer 120 included within virtual machine 114 is the designated target computing device (i.e., to replace the functionality of server computer 116). Further, assume that the target storage device for the cache data currently stored on storage device 124 is storage device 128 (which is coupled to server computer 120 included within virtual machine 114).

As stated above, storage network 12 includes a plurality of storage targets (e.g., storage targets 102, 104, 106, 108). In order to increase the efficiency of the transfer of the cache data included within storage device 124 to storage device 128, an intermediary device (e.g., shared storage device 132) that has similar performance characteristics to that of storage device 124 and storage device 128 may be utilized. Accordingly, if storage devices 124, 128 are flash storage devices (as they are in this particular example), shared storage device 132 may also be a flash storage device.

The cache data stored within storage device 124 may include cache user data and/or cache metadata. Cache user data may include the actual data segments being stored within storage targets 102, 104, 106, 108. Examples of such cache user data may include but are not limited to database files, spreadsheet files, document files, etc. Cache metadata may include data that locates and/or provides information concerning the cache user data. Examples of such cache metadata may include but are not limited to data that locates the specific data segment within storage device 124, and data that provides information concerning the data segment (e.g., author, edit time/date, expanded description, etc.).

Figure 3:
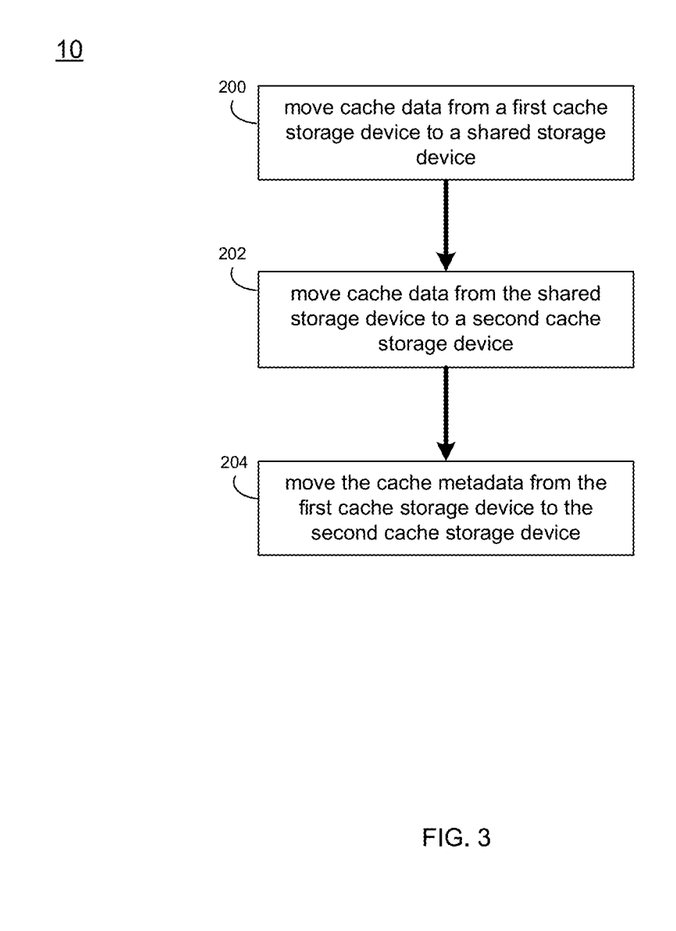
FIG. 3 is a flowchart of the cache process of FIG. 1.

Accordingly and referring also to FIG. 3, cache process 10 may move 200 at least a portion of the cache data from storage device 124 coupled to server computer 116 included within first virtual machine 112 (i.e., the virtual machine to be shut down in this example) to shared storage device 132. Accordingly and for example, each piece of data stored within storage device 124 may be moved to shared storage device 132. Accordingly and at the end of this operation, storage device 124 may be empty and all of the cache data that was previously stored on storage device 124 may be located on shared storage device 132.

Once this operation is fully or partially complete, cache process 10 may begin to move 202 the newly-relocated cache data from shared storage device 132 to (in this example) storage device 128 coupled to server computer 120 included within virtual machine 114 (i.e., the virtual machine replacing virtual machine 112 in this example). Accordingly and for example, each piece of data stored on shared storage device 132 may be moved to storage device 128. Accordingly and at the end of this operation, shared storage device 132 may be empty and all of the cache data that was previously stored on shared storage device 132 may be located on storage device 128.

As discussed above, cache data may include cache user data and/or cache metadata. Accordingly, the above-described operation carried out by cache process 10 may move 200, 202 cache user data and/or cache metadata.

Alternatively, cache process 10 may be configured to directly move 204 the above-described cache metadata from storage device 124 coupled to server computer 116 included within virtual machine 112 to storage device 128 coupled to server computer 120 included within second virtual machine 114. For example, the above-described cache metadata may be moved 204 from storage device 124 to storage device 128 via a Layer 3 procedure.

As discussed above and in the TCP/IP model, Layer 3 may be referred to as the Internet layer. Within a Layer 3 network, devices (e.g. the devices within virtual machine layer 100 and storage targets 102, 104, 106, 108) may be addressed using IP (i.e., Internet Protocol) addresses. When network infrastructure 110 is a Layer 3 network infrastructure, each of the devices within virtual machine layer 100 and storage targets 102, 104, 106, 108 may have a unique IP address.

Once the above-described cache data movement procedures are effectuated and the appropriate additional procedures are performed (e.g., starting up virtual machine 114 and the appropriate applications on computer server 120), virtual machine 112 may be shut down. Accordingly, once the functionality of virtual machine 112 has been migrated to virtual machine 114, virtual machine 114 for all intents and purposes has essentially become virtual machine 112, as virtual machine 112 was replicated in virtual machine 114 and then virtual machine 112 was shut down. Therefore and as discussed above, to a user (e.g., users 46, 48, 50, 52) that is using one of the applications that is being executed on virtual machine 112, the transition from virtual machine 112 to virtual machine 114 would occur in the background and would be seamless go unnoticed by the user.

While storage devices 124, 126, 128, 130 are described above as being flash-based storage devices that are configured to solely function as cache devices for data that is being stored to and/or retrieved from one or more of storage targets 102, 104, 106, 108, other configurations are possible and are consider to be within the scope of this disclosure. Further, while one or more of storage targets 102, 104, 106, 108 are described above as being coupled of server computers that are included within virtual machines, this is for illustrative purposes only and is not intended to be a limitation of this disclosure. Accordingly and for the following discussion, while storage targets 102, 104, 106, 108 are coupled to server computers, the server computers to which they are coupled need not be included within virtual machines and may be e.g., stand alone application servers.

For example, cache process 10 may configure one or more of storage devices 124, 126, 128, 130 (which may or may not be included within one or more virtual machines) so that they function as both a cache device and an application storage device. Specifically and referring also to FIG. 4, cache process 10 may define 250 a cache storage portion within a cache storage device (e.g., storage device 124) coupled to a computing device (e.g., server computer 116). Cache process 10 may also define 252 an application storage portion within the cache storage device (e.g., storage device 124) coupled to the computing device (e.g., server computer 116). Accordingly, if storage device 124 is a sixty-four gigabyte flash storage device, cache process 10 may configure storage device 124 so that a first thirty-two gigabytes of the sixty four gigabytes would be viewable and mappable as a disk drive usable by the applications being executed on server computer 116 (i.e., the application storage portion) and the remaining thirty-two gigabytes of the sixty four gigabytes would be useable for the above-described caching services (i.e., the cache storage portion).

Figure 4:
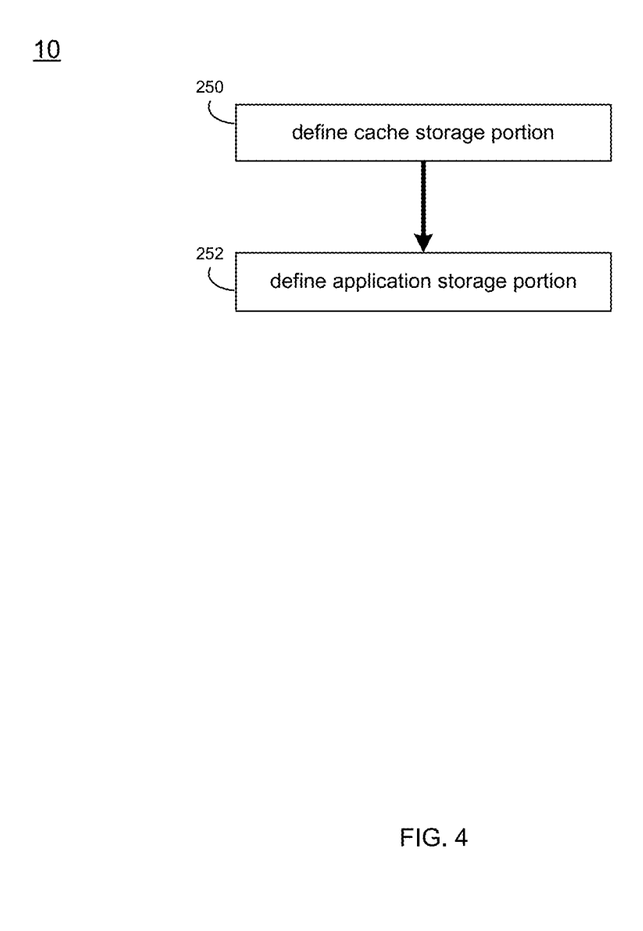
FIG. 4 is a flowchart of the cache process of FIG. 1.

When e.g., storage device 124 is configured in this fashion by cache process 10, the cache storage portion will be configured to cache data that is stored to and/or retrieved from one or more of storage targets 102, 104, 106, 108; while the application storage portion will be configured to store application data that is being used by one or more of the applications being executed by e.g., server computer 116. For example, once an application storage portion is configured by cache process 10, this application storage portion may be used to store a swap file that is used by e.g., a database application being executed on server computer 116.

When configuring the application storage portion of e.g., storage device 124, the above-described application storage portion may be overprovisioned, in that the actual size of the application storage portion defined 252 by cache process 10 may be smaller than the size identified as being available to the application(s). Continuing with the above-stated example, assume that storage device 124 is a sixty-four gigabyte flash storage device. Further assume that cache process 10 configures storage device 124 so that a first thirty-two gigabytes of the sixty-four gigabytes is viewable and mappable as a disk drive usable by the applications being executed on server computer 116 and the remaining thirty-two gigabytes of the sixty four gigabytes is useable for the above-described caching services. Accordingly, cache process 10 may overprovision the application storage portion so that it appears that e.g., forty-eight gigabytes of storage are available to the applications on server computer 116. However, while only thirty-two gigabytes of storage are actually available within storage device 124 for the application storage portion, in the event that the various applications being executed on server computer 116 use more than the thirty-two gigabytes of available storage space, cache process 10 may dynamically reduce the size of the cache storage portion so that a maximum application storage portion of forty-eight gigabytes of storage space is available for the applications being executed on server computer 116.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A computer-implemented method comprising:
   upon receiving an indication that a first virtual machine will be brought out of service:
   moving at least a portion of cache data from a first cache storage device coupled to a first computing device included within the first virtual machine to a shared flash storage device of a plurality of storage targets, wherein the cache data includes cache user data and cache metadata, wherein the cache metadata includes location data regarding which data segments of the cache user data are included within which of the plurality of storage targets and location in the first cache storage device;
   once moving the cache user data from the first cache storage device coupled to the first computing device to the shared flash storage device is partially complete, moving the cache user data from the shared flash storage device to a second cache storage device coupled to a second computing device included within a second virtual machine;
   moving the cache metadata from the first cache storage device included within the first virtual machine directly to the second cache storage device included within the second virtual machine;
   configuring the second cache storage device to replicate the an overprovisioning functionality of the first cache storage device; and
   after all of the cache data is moved from the shared flash storage device to the second cache storage device, shutting down the first virtual machine;
   wherein transition of the cache data and the cache metadata from the first virtual machine to the second virtual machine occurs without interruption to a user using an application executing on the first virtual machine.

2. The computer-implemented method of claim 1 wherein the shared flash storage device includes flash memory.

3. The computer-implemented method of claim 1 wherein the shared flash storage device is included within a storage area network.

4. The computer-implemented method of claim 1 wherein the first and/or second cache storage devices include flash memory.

5. A computer program product residing on a non-transitory computer readable medium having a plurality of instructions stored thereon which, when executed by a processor, cause the processor to perform operations comprising:
   upon receiving an indication that a first virtual machine will be brought out of service:
   moving at least a portion of cache data from a first cache storage device coupled to a first computing device included within the first virtual machine to a shared flash storage device of a plurality of storage targets, wherein the cache data includes cache user data and cache metadata, wherein the cache metadata includes location data regarding which data segments of the cache user data are included within which of the plurality of storage targets and location in the first cache storage device;
   once moving the cache user data from the first cache storage device coupled to the first computing device to the shared flash storage device is partially complete, moving the cache user data from the shared flash storage device to a second cache storage device coupled to a second computing device included within a second virtual machine;
   moving the cache metadata from the first cache storage device included within the first virtual machine directly to the second cache storage device included within the second virtual machine;
   configuring the second cache storage device to replicate the an overprovisioning functionality of the first cache storage device; and
   after all of the cache data is moved from the shared flash storage device to the second cache storage device, shutting down the first virtual machine;
   wherein transition of the cache data and the cache metadata from the first virtual machine to the second virtual machine occurs without interruption to a user using an application executing on the first virtual machine.

6. The computer program product of claim 5 wherein the shared flash storage device includes flash memory.

7. The computer program product of claim 5 wherein the shared flash storage device is included within a storage area network.

8. The computer program product of claim 5 wherein the first and/or second cache storage devices include flash memory.

9. A computing system including a processor and memory configured to perform operations comprising:
   upon receiving an indication that a first virtual machine will be brought out of service:
   moving at least a portion of cache data from a first cache storage device coupled to a first computing device included within the first virtual machine to a shared flash storage device of a plurality of storage targets, wherein the cache data includes cache user data and cache metadata, wherein the cache metadata includes location data regarding which data segments of the cache user data are included within which of the plurality of storage targets and location in the first cache storage device;
   once moving the cache user data from the first cache storage device coupled to the first computing device to the shared flash storage device is partially complete, moving the cache data from the shared flash storage device to a second cache storage device coupled to a second computing device included within a second virtual machine;
   moving the cache metadata from the first cache storage device coupled to the first computing device included within the first virtual machine directly to the second cache storage device coupled to the second computing device included within the second virtual machine;
   configuring the second cache storage device to replicate the an overprovisioning functionality of the first cache storage device; and
   after all of the cache data is moved from the shared flash storage device to the second cache storage device, shutting down the first virtual machine;

wherein transition of the cache data and the cache metadata from the first virtual machine to the second virtual machine occurs without interruption to a user using an application executing on the first virtual machine.

10. The computing system of claim 9 wherein the shared flash storage device includes flash memory.

11. The computing system of claim 9 wherein the shared flash storage device is included within a storage area network.

12. The computing system of claim 9 wherein the first and/or second cache storage devices include flash memory.

13. The computer-implemented method of claim 1 wherein the cache metadata is moved from the first cache storage device coupled to the first computing device included within the first virtual machine to the second cache storage device coupled to the second computing device included within the second virtual machine via a Layer 3 network procedure.

14. The computer program product of claim 5 wherein the cache metadata is moved from the first cache storage device coupled to the first computing device included within the first virtual machine to the second cache storage device coupled to the second computing device included within the second virtual machine via a Layer 3 network procedure.

15. The computing system of claim 9 wherein the cache metadata is moved from the first cache storage device coupled to the first computing device included within the first virtual machine to the second cache storage device coupled to the second computing device included within the second virtual machine via a Layer 3 network procedure.

* * * * *